July 4, 1933.     A. ANDREAS     1,916,293
METHOD AND APPARATUS FOR MANUFACTURING VALVE BAGS
Filed Aug. 14, 1930     5 Sheets-Sheet 1

INVENTOR
Arno Andreas.
by C. A. Goepel
his ATTORNEY.

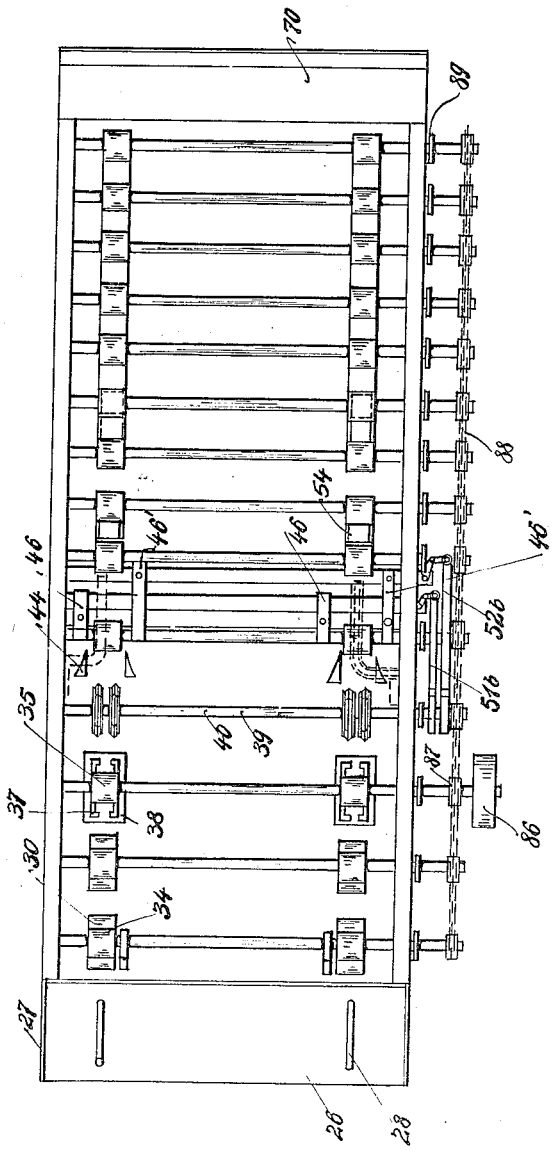

July 4, 1933.  A. ANDREAS  1,916,293
METHOD AND APPARATUS FOR MANUFACTURING VALVE BAGS
Filed Aug. 14, 1930   5 Sheets-Sheet 3
Fig. 4
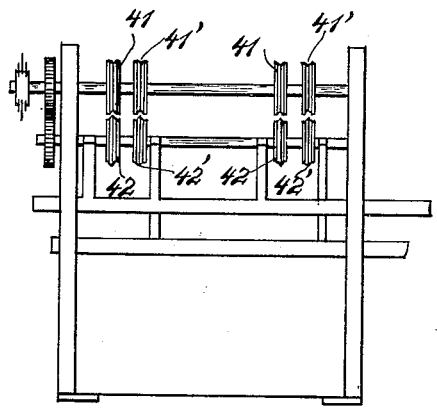
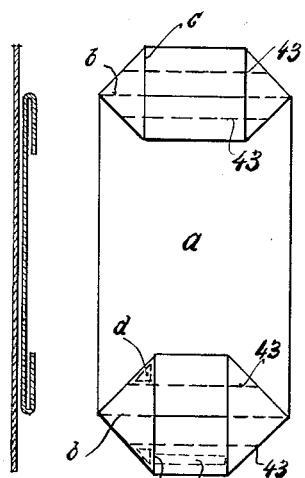
Fig. 16   Fig. 17
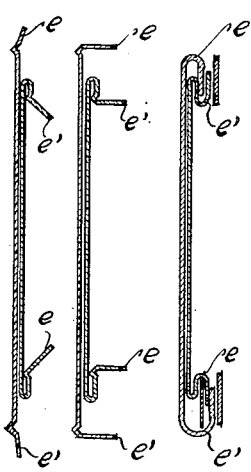
Fig. 18   Fig. 19
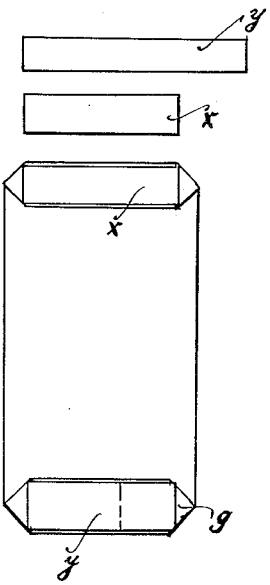
Fig. 20   Fig. 21
INVENTOR
Arno Andreas.
by
his ATTORNEY.

July 4, 1933.    A. ANDREAS    1,916,293
METHOD AND APPARATUS FOR MANUFACTURING VALVE BAGS
Filed Aug. 14, 1930    5 Sheets-Sheet 4
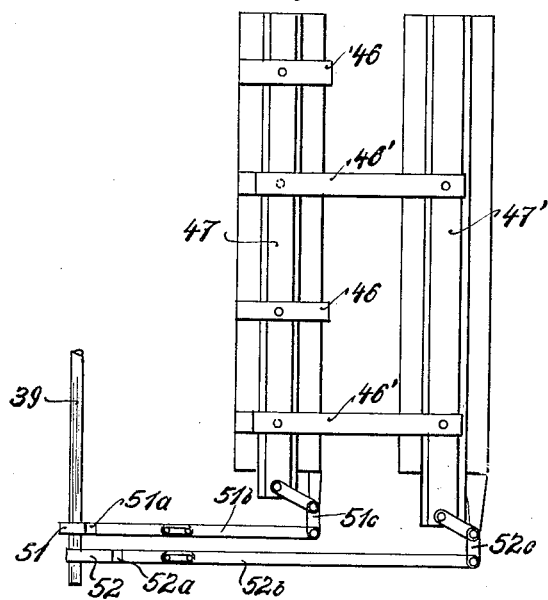
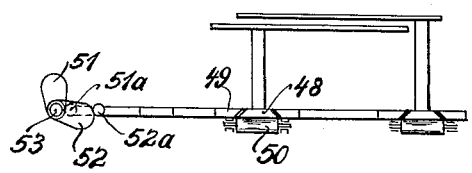
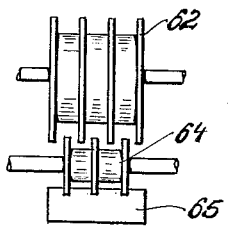
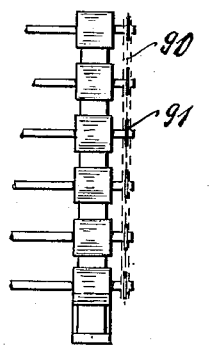
INVENTOR.
Arno Andreas.
by his ATTORNEY.

July 4, 1933.  A. ANDREAS  1,916,293
METHOD AND APPARATUS FOR MANUFACTURING VALVE BAGS
Filed Aug. 14, 1930  5 Sheets-Sheet 5

Inventor
Arno Andreas
by C. P. Goepel
his Attorney

Patented July 4, 1933

1,916,293

UNITED STATES PATENT OFFICE

ARNO ANDREAS, OF MUNSTER, GERMANY

METHOD AND APPARATUS FOR MANUFACTURING VALVE BAGS

Application filed August 14, 1930, Serial No. 475,299, and in Germany August 12, 1929.

This invention relates to the manufacture of valve bags having so-called crossed ends, and the invention comprehends both a method of manufacture and an improved apparatus for carrying out the method.

Valve bags produced from sheets of paper and having what is known as crossed bottoms have heretofore been made either by hand or by separate devices or apparatuses, independently operated to carry out special phases or steps in the manufacture of the complete bag.

In the manufacture of valve bags of the kind mentioned, it is necessary to provide suitable tubes cut to bag lengths and consisting preferably of several sheets of paper. Subsequently, the ends of the cut-off bag lengths are opened and creased to provide flap portions, and then the flap portions are folded in inter-crossed relationship and pasted. It has, heretofore, been suggested that the forming of a crossed end may be accomplished by means of sheet metal guides against which the tubes are advanced. Where, for the bags of larger size, strong and tenacious paper is used, the creases of the folds usually lack sharpness and the folds themselves are twisted and imperfect.

The present invention has for its object the provision of means whereby through a continuous operation to produce valve bags having crossed ends and to reinforce the ends by pasting strips of paper thereon. The cut length of the tube is flattened with one side overlying the other, and the opposite ends of the flattened tube are sharply creased to provide parallel flap portions which are folded to overlap one another and pasted together in overlapping relation by means of paste previously applied, so as to form the so-called crossed ends. The reinforcing strip is then pasted upon the so-formed crossed ends.

For the formation of a valve, the cross pasting at one of the four corners is avoided and preferably at this particular corner a projecting end of the reinforcing strip is folded inwardly to overlie the inner faces of the overlapping flaps. In this way an internal valve or flap is obtained. The crossed ends so produced have sharp creases, the flaps are secured in a smooth, parallel, and symmetrical relationship, and these together with the extra strips which are pasted thereon provide a dependable closure.

According to my invention, the manufacture of the valve bags is accomplished in a single, continuous operation without the intervention of labor, excepting, of course, the laying on of the pre-folded tube lengths and the removal of the finished bags, and even these two mentioned services may be carried out automatically by mechanical means which do not constitute the subject matter of the present invention. By my improvements the output of the bags is greatly increased with a corresponding reduction in cost. The substantial reduction in manual labor further reduces the cost of manufacture.

My invention refers especially to the manufacture of bags, consisting of several layers of paper, for containing cement, chalk, plaster of Paris and other materials of a similar character.

In addition to the foregoing objects, I provide as hereinafter set forth, an apparatus for continuously and automatically carrying out my invention, the same embodying a number of special advantages, the purpose and object of which are to improve the mode of operation and practical application of my method in general.

The principles of the invention and the preferred mode of carrying the same into effect in a practical way will best be understood by referring to the accompanying drawings, more or less diagrammatical in character, and in which:—

Figure 1 represents a side elevational view through a machine for carrying out my invention, the side frame being removed and the gearing connections for operating the rollers being omitted;

Fig. 2 represents a top plan view of the machine;

Fig. 3 is a view similar to Fig. 1 but showing a modified form of the construction;

Fig. 4 represents a detail view in elevation, showing the pairs of rollers for creasing and bending the spread sections at the opposite ends of the bag;

Fig. 5 is a fragmentary top plan view showing the operative parts whereby the flap portions are folded in overlapping relation;

Fig. 6 is a side view of the parts shown in Fig. 5;

Fig. 7 is a detail view showing the cooperating wheel and guides by means of which the paste is applied to the severed reinforcing strips;

Fig. 8 is a plan view, showing one of the units for feeding the reinforcing strips which are to be pasted to the overlapping flap portions;

Figs. 16 to 21 are longitudinal views showing the bag in successive stages of manufacture, Figures 16, 18, 19 and 20 representing sectional views, while Figures 17 and 21 are plan views.

Figure 9:
Fig. 9 is a detail view in cross section, showing the arrangement of the guides for retaining the advancing reinforcing strips in proper position.

In order that the embodiments of my invention herein presented may be more readily understood, it is in place to state here that the bags are pre-folded in a known manner before being placed in the machine. In order that the bags will have the requisite strength, they may consist, and preferably do consist, of several plies of paper, which may be pasted together by means of the apparatus disclosed in my application for Letters Patent of the United States, Serial No. 475,301 filed August 14, 1930. The paper blanks, from which the bag is produced, are folded longitudinally in known manner and the longitudinal marginal edges thereof are pasted or otherwise secured together, so as to provide a paper tube having open ends. The tube is flattened and its opposite ends are doubled upon themselves. In Figs. 16 to 21, I illustrate, more or less diagrammatically, a bag $a$ of the type referred to, the same, however, in order to avoid confusion of lines, being shown merely as a single ply of paper. Each of the end portions of the bag is doubled upon itself as shown, providing thereby a transverse crease line $b$. The doubled-over portions are then opened in the usual way and flattened down as shown, so as to provide sections including spaced-apart parallel edges $c$ which extend transversely across the crease line $b$ as best shown in Fig. 17. By this pre-folding procedure, a type of bag having what is known as crossed ends or crossed bottoms is produced. In so far as the invention of my present application is concerned, such pre-folding is accomplished prior to the introduction of the bag into the machine. Inasmuch as there are two cross ends to be operated upon by the machine, attention is here called to the fact that my improved machine involves, except as hereinafter specified, duplicate sets of operating devices.

Referring now in detail to the drawings, it will be seen that the machine of my invention comprises an elongated frame structure or bed-plate 25 which may be of any suitable design or arrangement adapted properly to support the working parts hereinafter to be described. The immediate or individual supports for the working parts may be of any suitable design or construction, and since their particular design and construction are not essential to my invention, such supports have in many instances been omitted in order better to illustrate the working parts of the machine.

At the front or left-hand end of the machine as herein depicted, there is provided a transversely extending table 26 on which the bags are placed one after another with their pre-folded ends facing downward. Fig. 17 shows an underneath plan view of the bag. Upon said table 26 the bags are deposited with their lengths extending transversely of the machine and they are guided into the machine by means of an upstanding guide plate 27 arranged at one side of the machine, as best shown in Fig. 2. The bags may be disposed upon the table and against the guide plate 27 either by hand or by any suitable automatic device. Each bag as it is deposited upon the table 26 is advanced inwardly of the machine by a pusher device 28, which at its lower end is pivoted at 29 to the machine. This device receives its motion from a cam 30 in engagement with a roller 31 carried by an arm 32 which is mounted on the device 28 and which is held in operative relation to the cam by means of a pull spring 33. Preferably there are two sets of cams 30 and cooperating arms 32. Said pusher device 28 advances the bag to a position where it will be seized by the cooperating pair of feeding rollers 34. The cams 30 are suitably carried by the shaft of the lower roller 34. By the rollers 34, the bag is advanced through the means for applying paste areas $d$ (Fig. 17) such means consisting of an upper bearing roller 35 and a lower paste applying roller 36. The last-named roller carries paste-applying parts 37 which, during each revolution of the roller, dip into the paste contained in the receptacle 38. As best shown in Fig. 2, these parts are duplicated for each end of the bag.

When the paste areas have been applied, the bag moves to an upper and lower set of creasing and bending rollers, there being of course similar sets for the opposite ends of the bag. The upper sets are carried by a shaft 39, while the lower sets are on a shaft 40. Each upper set comprises two rollers 41, each of which is provided, as best shown in Fig. 4, with an annular groove 41'. Each lower set comprises two rollers 42 having annular ribs 42' for cooperating with the annular grooves of the rollers immediately above. These sets of cooperating rollers produce on opposite sides of the line $b$ sharp parallel crease indentations 43 as shown by the dot-dash lines in Fig. 17; and at the same time, as shown in Fig. 18, these rollers bend the outer flap portions $e$ and $e'$ somewhat downwardly.

The bag next reaches the pairs of folding guides 44 by means of which the flap portions $e$ and $e'$ are further bent downwardly so as to assume the angular positions shown in Fig. 19, whereupon they pass to the forming tables 45 which are in the form of elongated strip plates as best shown in Fig. 2.

At the forming tables the bag is operated upon by a folding apparatus by means of which the flap portions $e$ and $e'$ are folded into the position shown in Fig. 20 with the flap portions $e$ underlying the flap portions $e'$. For each end of the bag, the folding apparatus includes a folding rail 46 that folds over the flap portion $e$ and quickly thereafter another rail 46' folds over the other flap portion $e'$ in such manner that the so-called crossed end or bottom will be formed. The mentioned rails are in angular relation to the direction in which the bag moves and are controlled by actuating strips to which they are attached. By referring to Fig. 5, it will be seen that the folding rails 46 are carried by an actuating strip 47, while the folding rails 46' are carried by an actuating strip 47'. The said actuating strips 47 and 47' are moved to and fro transversely of the bed plate, to effect the desired folding of the flaps $e$, $e'$ through the respective folding rails 46, 46'. It will be seen that the movement of strip 47 and its associated rails 46 in one direction effects folding of flaps $e$, while the movement of the strip 47' and rails 46' in the opposite direction folds the flaps $e'$ over said flaps $e$. In the present exemplification, in effecting the folding operation, the actuating strip 47' moves in a direction opposite to the direction of movement of the other strip 47. As shown diagrammatically in Fig. 1, the said strips 47 and 47' are provided at their lower ends with shoes 48 which have sliding fit in guides 49; and said strips at their lower extremities are provided with rollers 50 which turn on suitable track members (not shown). As shown in Figs. 5 and 6, actuating strips 47 and 47' are operated respectively from cams 51 and 52 carried by a rotary shaft 39. Bearing on the cams 51 and 52 are the respective rollers 51a and 52a. Said rollers are carried by the respective connecting bars 51b and 52b. Suitable bell crank levers 51c and 52c connect the opposite ends of the bars 51b and 52b with the respective actuating slides operated thereby.

The flap portions, having been folded into the position shown in Fig. 20, pass through U-shaped guides 54 designed to prevent the folded flaps, which have been pasted together owing to the presence of the paste areas $d$, from separating; and said guides 54 serve as means for directing the bag between upper and lower pressure rollers 55; the purpose of which is to press the folded flap portions into compact flat positions and at the same time to advance the bag to the upper and lower rollers 56 where the reinforcing strips are pasted upon the folded flap portions.

We now come to the means for furnishing the reinforcing strips which are to be pasted on the folded over flap portions at each end of the bag. In the present embodiments, right and left-hand units are provided in order to furnish the reinforcing strips for the right and left-hand ends, respectively, of the bag. Each of the units includes a supply roll of paper 57 rotatable on an axis shaft 58. A pair of cooperating rollers 59 pulls the strip of paper from the supply roll 57 and feeds the strip between two roller devices 60 and 60' which are operated faster than the rollers 59. The body of the lower roller 60' is cut away in part as shown at 60'' so that the strip will at intervals slide loosely between rollers 60' and 60.

Prior to reaching the rollers 60 and 60', the strip passes between the cross cutters 61, 61' where the strips are severed into the desired lengths. As soon as a strip has been cut off, that part of the rollers 60' which is not cut away presses the severed strip against the roller 60 whereby to cause the severed strip to move with a quick motion over the guides 62 which are curved around a bearing roller 63. Said guides 62 extend upwardly so that the strip will be pasted upon the folded flap portions from underneath before the bag enters the roller pair 56.

Figure 10:
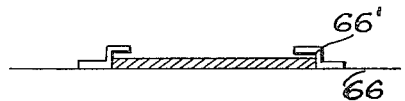
Fig. 10 is a similar view showing the plates and guides for holding the reinforcing strips in place as they advance from the feeding rollers.

As best shown in Fig. 7, the guides 62 comprise spaced-apart longitudinally extending strips, and below the bearing roller 63 paste-applying rollers 64, which dip steadily into the paste contained in the receptacle 65, pass between the guides 62 and apply to the strip stripes of paste $f$ by means of which the strip is pasted to the folded flap portions. To prevent the guides 62 from becoming soiled by the dripping paste, a margin of space is left between said guides and the rollers 64. As best shown in Figs. 8 and 10, suitable plates 66 with guides 66' are provided for holding the strips in place as they are advanced from the feeding rollers 59 to the guides 62; and as best shown in Fig. 9, said guides 62 have associated therewith marginal guides 67 of channel shape form in cross section for holding the advancing strips in proper position. The completed bag, after passing through the roller pair 56, is carried by roller pairs 68 and 69 to the discharge table 70. The rollers 68 and 69 or certain of them, may be heated in order that the paste will be dried quickly.

Figure 11:
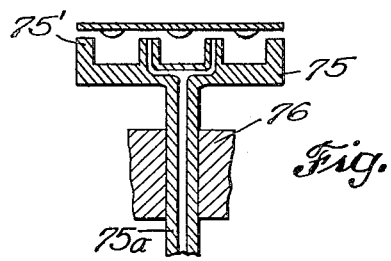
Fig. 11 is a sectional detail view of the vacuum table for applying the special valve strips.

In Figs. 20 and 21, I show a severed strip, which is denoted by the reference character $x$, applied to the flap portions at the left-hand end of the bag. At the right-hand end of the bag I show a reinforcing strip $y$ applied to the folded flap portions, which strip $y$ is longer than the strip $x$, being provided with an integral portion $y'$, which is inserted through the filling opening $g$ and pasted to the inner faces of the folded flap portions. In the modified form of construction shown in Fig. 3, I show diagrammatically, the means for furnishing and applying the strip $y$. The machine illustrated in Fig. 3 is otherwise of the same construction as that shown in Figs. 1 and 2. In the exemplification shown in Fig. 3, the strip is drawn in the same manner as hereinbefore described, from a supply roll 57 by the feeding rolls 58 and 59 and passed to the rollers 60, 60' so that the strip will be severed by the cross cutters 61, 61'. From the rollers 60, 60' the severed strip passes between a bearing roller 71 and paste applying rollers 72 which dip into the paste contained in the receptacle 73. In this case, the spaced guides 74, between which the paste-applying rollers operate to put stripes of paste on the strip of paper, extend upwardly and forwardly to deliver the strip upon a vertically movable lifting table 75. In construction, the spaced guides are otherwise similar to the spaced guides 62. In this case also, the feeding rollers 59 are operated at a faster rate of speed than the corresponding rollers in the constructional form of Figs. 1 and 2, so that the cutters 61, 61' will cut off a reinforcing strip $y$ which is longer than the reinforcing strip $x$. The lifting table 75, as best shown in Fig. 11, is provided with spaced upstanding ledges 75' which constitute a continuation of the path formed by the guides 74 so that the applied stripes of paste are exposed between the ledges 75'. The table has a stem or shank 75a slidably mounted in a guide piece 76. Some of the ledges 75' are hollow and have orifices at their edge ends. Both the table 75 and its shank 75a are also hollow and provide communicating passages with the hollows of the ledges 75'. A partial vacuum is created in the ledges by means of a vacuum suction pump (not shown) which is connected with the shank of the table by means of a conduit 77. As soon as the severed strip $y$ reaches a stop piece 78 upon the table, a control device (not shown, but which may consist of any vacuum device as commonly employed on paper handling machines) is operated so as to produce a suction draft through the ledges, table and shank so as to hold the strip $y$ upon the top edges of the ledges 75'. Instead of the vacuum apparatus herein described, any other suitable means such as tongues or gripping fingers may be employed for holding the strip $y$ in place upon the top edges of the ledges 75'.

The table 75 is elevated by means of a lever 79 fulcrumed at 79' and having at its power receiving end a roller which bears on a cam 81 upon the shaft 80. At its opposite end the lever 79 is connected through a suitable lost-motion link 82 with the shank of the table.

Figure 12:
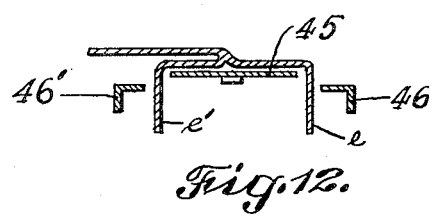
Figs. 12, 13 and 14 are diagrammatic detail views showing the successive steps for applying and folding the special valve strips.
Figure 13:
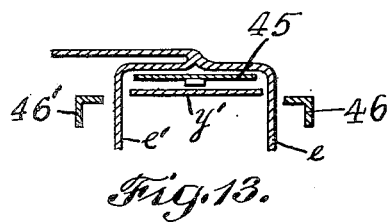
Figure 14:
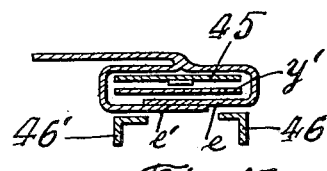

During the upward movement of the table, the strip $y$ will pull away from the guides 74 and pass along the folding edge 83 whereby its main portion $y$ is bent. Said table 75 thereupon presses the strip portion $y'$ against the lower side of the forming table 45 over which the tube passes as hereinbefore described. In this case, the forming table 45 contains a vacuum conduit 84 which terminates in orifices as 85 at the underneath face of the table. Any suitable means may be employed for controlling the vacuum air so that as soon as the strip is pressed against the under side of the table 45 it will be held there by the vacuum action. Thereupon the vacuum action in table 75 is interrupted and this table is lowered. For accomplishing these functions it will be evident that, for example, valves controlling the supply of suction to the respective tables 45, 75, may be operated at the appropriate times through connections controlled by cams driven by the machine, or through connections associated with table 75 (such as valve operated solenoids controlled by contacts operated by the table), so that when the table 75 reaches its uppermost position wherein the strip is pressed against the table 45, a suction or vacuum is placed in communication with table 45 and concurrently the supply of suction to table 75 is interrupted. Any of a variety of means of well-known type may be employed for establishing or disestablishing the suction in tables 45 and 75 at the proper times. The strip clings with its elevated end upon the under side of the table 45, while its free end portion $y$ as bent by the edge 83 rests on the guides 74. As soon as the table 75 returns to its lowered position, the folding operation on the table 45 is carried through in the manner hereinbefore described, for the bag tube has reached the table 45 in the meantime. In this way, the paper strip is moved to and the portion $y'$ thereof, supported at the underside of the table 45 so that, as illustrated in Figs. 12 to 14, the folding rails will fold the flap portions over and upon that portion of the strip held underneath the table 45. The strip, thus having a portion thereof secured by the flap portions, moves along with the bag so that by the time the bag reaches the roller pair 55, the portion $y$ of the strip which rests upon the guides 74 will be applied to the outer faces of the flap portions.

The pre-folded bags placed upon the table 26 are moved continuously and uninterruptedly through the machine until delivered on the discharging table 70, from which they may be carried away by manual labor or where any suitable packing, stacking or other type of delivery mechanism may be arranged for receiving and removing the finished bags falling from the discharging table 70. The flap portions, as we have seen, are provided with paste or other adhesive, and are bent and pasted together in the so-called crossed or overlapping relation, all during the uninterrupted movement of the bag through the machine. Additionally, as we have seen, the reinforcing strips, whether of the $x$ type or of the $y$ type, are pasted to the crossed or ovelapping portions while the bag travels through the machine.

Any suitable or approved means or transmission may be provided for imparting power to the various rollers and working devices hereinbefore described. In the present embodiments, power for operating the machine may be applied to a pulley 86, herein shown as attached to the shaft of the bearing roller 35. All the upper shafts of the roller pairs are driven from the shaft of said roller 35 by means of suitable sprocket gears 87 and sprocket chains 88. The shafts of the corresponding lower rollers are operated from the upper shafts by means of interengaging gears 89. In a similar manner, as shown in Fig. 8, the units for carrying the reinforcing strips into position to be pasted to the underneath faces of the flap portions are operated by chains 90 connecting sprocket gears 91 on the upper shafts of the roller pairs, while the lower shafts are engaged through suitable gearing (not shown) with the upper shafts.

Figure 15:
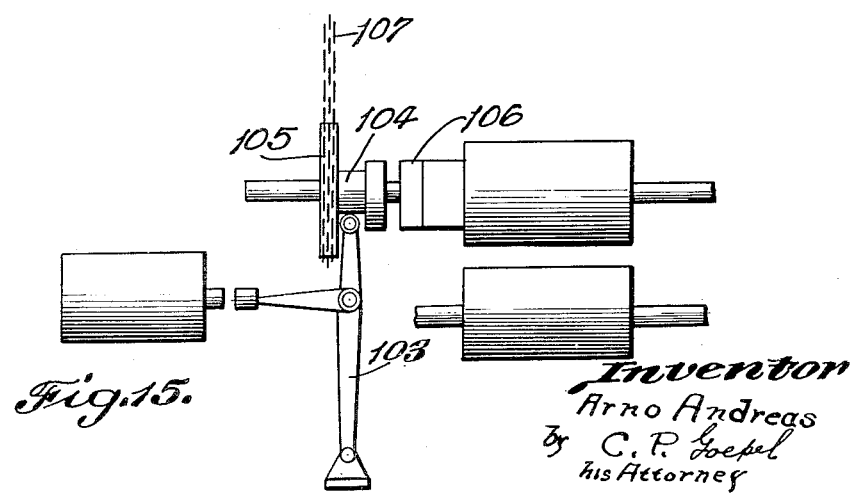
Fig. 15 is a detail of the electrically controlled clutch for controlling the cutter for severing the strips.

According to a feature of my improvements, provision is made for automatically preventing the delivery of reinforcing strips when no bags are being fed over the table 26 into the machine. The provision of means for this purpose includes, behind the roller pair 34, a contact plate 92 and a sliding finger 93 which is normally engaged with the contact plate, but which is separated therefrom by an intervening tube in order to break an electrical circuit. In Figs. 1 and 2 the lower shaft which carries the ribbed creasing and bending wheels 42 is represented as provided with a non-conductive disk 94 to which is secured a current conductive segment 95. Adapted to engage said segment 95 are two contacts 96. The segment piece 95 is so arranged that it will engage both contacts 96 during the time a bag passes between the contacts 92 and 93. A circuit wire 97, having incorporated therein a source of current 98, extends from an electromagnet 99 to the spring contact 93. A conducting wire 100 extends from the other contact 92 to one of the contacts 96; and a further electric wire 101 extends from the opposite contact 96 to the opposite side of the electromagnet 99. Under this arrangement, the circuit will be interrupted whenever a bag passes between the contacts 92 and 93. When the contacts 92 and 93 are in engagement during the interval between the feeding of two bags, the circuit is interrupted by the non-conductive disk 94. However, when no bags are fed across the table 26, the contacts 92 and 93 are in engagement and close the circuit so that the electromagnet 99 will be energized. A lever 102 is connected through a bell crank 103 with the axially slidable clutch part 104, so that when the electromagnet is energized said lever 102 will be attracted thereto and move the clutch part 104, which carries a driving gear 105, out of engagement with the clutch part 106. This clutch arrangement is illustrated in Fig. 15 from which it will be seen that the clutch parts are associated with the shaft for the cross cutting device 61'. The said driving gear 105 may be operated as by means of a chain 107 extending to a suitable driver. In the present instance said chain 107 is represented as receiving its power through the rotation of the shaft carrying the lower roller 68. In this way, when the lever 102 is attracted to the electromagnet, the operating parts of the strip conveying unit are brought to a stop.

The path of travel of the bags through the machine cannot be soiled by the liquid paste since all the paste-applying rollers are arranged below such path. Liquid paste is preferably employed since it is cheaper and since this is the kind of paste commonly employed in the manufacture of bags of this type. The bags move through the machine one after another with a uniform speed, and since the movement of the bags is uniform and uninterrupted, the disturbances usually caused by differences in speeds and stoppages do not occur. The distance between the rollers along the path of travel of the bags is always smaller than the width of the bags. In the diagrammatic drawings, for the purpose of better illustration, the distances between the upper and lower members of each roller pair are exaggerated.

While I have described my invention as comprising a certain mode of treatment and have illustrated it with the aid of certain selected embodiments for carrying it into effect, it will be understood that the invention may be variously embodied. It has been sought herein to illustrate only such embodiments as will suffice to exhibit the character of the invention. Reservation is, therefore, made to the right and privilege of changing the form of the details herein set forth or otherwise altering the arrangement of the parts without departing from the spirit or scope of the invention or the scope of the appended claims.

I claim:—

1. Apparatus for producing bags with crossed ends from a tube having end sections spread from a traverse, comprising means for moving the tube in a path, means in the path for making sharp indented fold creases in the end sections parallel to the traverse so as to produce end flaps thereby, a forming table in the path and means cooperating therewith for folding the flaps flat from the creases upon the end sections and across the traverse, and means for applying a gummed strip to said flaps.

2. Apparatus for producing bags with crossed ends from a tube having end sections spread from a traverse, comprising means for moving the tube in a path, operative means at separate points along the path for operating upon the end sections, consisting of creasing rollers by means of which to make sharp indented fold creases in the end sections parallel to the traverse so as to produce end flaps thereby, guides for the flaps and a forming table for engaging the same, and rail folders cooperating with the table and operating to fold the flaps from the creases inwardly upon the end sections and across the traverse, means for applying a gummed strip to said flaps, and a pair of pressure rollers between which the bag passes for pressing the gummed strip and flaps upon the end sections.

3. Apparatus for carrying through the folding of bag ends having sections spread from a traverse, comprising in combination means for moving the bag in a path, means for creasing the end sections and bending from the creases flaps which are parallel to the traverse, means for applying adhesive to the flaps, means for folding the flaps upon the sections, means for feeding a gummed strip and applying it longitudinally of the traverse upon the flaps, and means for pressing said strip and flaps into firm attachment.

4. Apparatus for carrying through the folding of bag ends having sections spread from a traverse, comprising in combination means for moving the bag in a path, means for creasing the end sections and bending from the creases flaps which are parallel to the traverse, means for applying adhesive to the flaps, means for folding the flaps upon the sections, means for feeding a gummed strip and applying it longitudinally of the traverse prior to the folding of the flaps so that the flaps will be folded over a portion of the strip, and means acting on the remainder of the strip to cause the same to fold over one end of the flaps and upon the outer faces thereof, and means for pressing the inter-engaged strip and flaps into firm attachment.

5. Apparatus for carrying through the folding of bag ends having sections spread from a traverse, comprising in combination means in the form of cooperating ribbed and grooved rollers for creasing the end sections and bending from the creases flaps which are parallel to the traverse, rollers for applying paste to the flap areas prior to the formation of the flaps, a folding device including a table for the bag and cooperating folding rails for the flaps, adapted to fold the flaps one after the other to the sections, means for feeding a gummed strip and applying it longitudinally of the traverse upon the folded flaps, means for pressing the strip and flaps into firm attachment upon the sections, means separate from one another for feeding a succession of bags and strips to effect the beforementioned operations in attaching the strips to the folded flaps of the bags, and means controlled by a termination of the feeding of the bags for stopping the feeding of the strips.

6. In apparatus for carrying through the folding of bag ends having sections spread from a traverse, means for effecting a continuous travel of the bags past a forming table, means arranged prior to the travel of the bags past the table for creasing the end sections and bending from the creases flaps which are parallel to the traverse, actuating devices cooperating with the table for folding the flaps upon the sections, in combination with means for supplying gummed strips and effecting a travel of the same to the path of travel of the bags, means arranged to cause the application of the gummed strips upon the folded flaps, and means for pressing the strips firmly upon the flaps.

7. In apparatus for carrying through the folding of bag ends having sections spread from a traverse, consisting of an arrangement of rollers for effecting a continuous travel of the bags, certain of said rollers being constructed and arranged to crease the sections parallel to the traverse and bend flaps from the creases, a forming table in series with the creasing rollers to hold the traveling bags firmly, guide members for bending the flaps to suit the forming table, a pair of actuating strips associated with the table and carrying folding rails for operating on the flaps, said actuating strips being movable from opposite directions to cause the rails to engage the outer sides of the flaps and fold them inwardly over the sections, means for applying gummed strips to the flaps longitudinally over the traverse, and certain of the rollers in subsequent series with the table being arranged to press the strips tightly upon the flaps and sections.

8. Mechanism for folding a pair of flaps one over the other upon the integral spread end sections of a bag, said mechanism comprising a table for supporting the bag during travel, a pair of actuating bars associated with the table and movable from opposite directions, and folding rails on the bars for the respective flaps for engaging the outer faces of the respective flaps whereby on movement of the bars from opposite directions to fold the flaps one over the other upon the sections.

9. In combination, a vacuum folding table having an underneath suction orifice, means for effecting the travel of a bag with opposing flaps across the table, with the flaps passing depending at opposite sides of the table, means for delivering a gummed paper strip against the underneath suction orifice where to cling by suction action, actuating bars associated with the table and movable from opposite directions, and folding rails on the bars for engaging the outer faces of the flaps whereby on movement of the bars from opposite directions to fold the flaps upon the gummed face of the strip so that the strip will be attached to the flaps on the inner faces thereof.

10. In combination, a vacuum folding table having an underneath suction orifice, means for effecting the travel of a bag with opposing flaps across the table, with the flaps passing depending at opposite sides of the table, means for delivering a gummed paper strip against the underneath suction orifice where to cling by suction action, said strip being of greater length than the flaps, actuating bars associated with the table and movable from opposite directions, folding rails on the bars for engaging the outer faces of the flaps whereby on movement of the bars from opposite directions to fold the flaps upon a portion of the gummed face of the strip so that such portions will be attached to the inner faces of the flaps, and means for causing the remaining portions of the strip to be folded over the ends of the flaps and upon the outer faces thereof during the travel of the bag.

11. In apparatus for carrying through the folding of the right and left ends of tubular bags, which ends have sections spread from a traverse, means for effecting the continuous travel of transversely disposed bags past a forming table, means arranged prior to the travel of the bags past the table for twice creasing each of the right and left end sections and bending from the creases flaps which are parallel to the traverse, actuating devices cooperating with the table for folding simultaneously each pair of flaps upon its corresponding end section, in combination with right and left supply means for supplying gummed strips and effecting a continuous travel of the same to the path of travel of the bags, and means for causing the strips from the right and left supply means to be applied to the folded flaps at the right and left ends of the bags.

12. The method of producing crossed ends on bags having end sections spread from a preliminary traverse, which consists in conveying the bags successively along a path, making parallel with the preliminary traverse, sharp indented fold inducing creases in the end sections, folding over the end sections from such creases to produce flaps which overlap one upon the other upon the end sections, and applying gummed strips to the flaps, then pressing the strips, flaps and sections together, each bag being individually so creased and folded, receiving the application of gummed strips and being pressed, all during its conveyance along the bag path.

13. The method of producing crossed ends on bags during an uninterrupted passage of the bags from a feeding station to a delivery station, in which the bags have end sections spread from a traverse, the bags passing successively and the end sections thereof passing through creasing mechanism, adhesive applying mechanism, folding mechanism, gummed strip applying mechanism and then pressing mechanism, which method consists in making by the creasing mechanism sharp indented fold inducing creases in the end sections, parallel to the preliminary traverse, to produce flaps, applying adhesive to the flaps by the adhesive applying mechanism, then folding the flaps one over the other upon the end sections by the folding mechanism, then applying gummed strips over the overlapping flaps and under the sections by the strip applying mechanism, and then pressing the gummed strips, flaps and sections firmly together by the pressing mechanism, each bag being individually subjected to each of said steps prior to arriving at the delivery station, with the completed crossed ends facing the same direction at the delivery station.

14. Apparatus for producing bags with crossed ends from a tube having spread end sections, comprising means for moving the tube, means for making sharp fold creases in the end sections so as to produce flap portions thereby, means for folding the flap portions in overlapping relation upon the end sections, and means for applying a gummed strip to said overlapping flap portions.

15. Apparatus for producing bags with crossed ends from a tube having spread end sections, comprising means for conveying the tubes, means for applying adhesive to the sections, means for making sharp fold creases in the end sections of the tubes so as to produce flap portions thereby, means for folding the flap portions in overlapping relation upon the end sections, and means for applying a gummed strip to said overlapping flap portions, the tubes being conveyed individually and in succession and uninterruptedly from the application of the adhesive to the completion of the application of the gummed strips.

16. Apparatus according to claim 14, characterized by the fact that means are provided for applying adhesive to the flap portions prior to the folding of the same in overlapping relation upon the end sections.

17. Apparatus according to claim 14, including means for applying adhesive to the flap portions prior to the folding of the same in overlapping relation upon the end sections and means for pressing the folded flap portions firmly upon the sections prior to the application of the gummed strip.

18. Apparatus according to claim 14, including means for applying adhesive to the flap portions prior to the folding of the same in overlapping relation upon the end sections, means for pressing the folded flap portions firmly upon the sections prior to the application of the gummed strip, and means for pressing the gummed strip, flaps and sections firmly together.

19. Apparatus according to claim 14, characterized by the fact that the gummed strip includes an extension together with means for applying the extension to the underside of the end sections.

20. The method of producing crossed ends on bags having end sections spread from a preliminary traverse and having like corner portions overlying the end sections from their outer opposite edges in a single plane and crossing the preliminary traverse, which consists of moving said bags successively along a bag path, making parallel with the preliminary traverse, sharp indented fold inducing creases in the end sections and overlying corner portions thereon, folding over the end sections and overlying corner portions from the so formed creases to produce flaps which overlap one upon the other for part of their area with the corner portions of the inner folded flap presented face downward upon the sections, and the corner portions of the outer folded flap presented face downward upon the sections in part and upon the inner folded flap in part, then applying gummed strips gummed face upward against the downward facing corner portions of the flaps and gummed face downward upon the outer surfaces of the flaps, then pressing the sections, flaps with corner portions and gummed strips together, each bag being individually so creased and folded and so receiving the application of gummed strips and being pressed, all during its conveyance along the bag path.

In testimony that I claim the foregoing as my invention, I have signed my name hereto.

ARNO ANDREAS.